United States Patent
Bell

(10) Patent No.: US 8,612,301 B2
(45) Date of Patent: Dec. 17, 2013

(54) METHOD FOR CREDITING USERS BASED ON PROPAGATING A TRANSACTIONAL APPLET

(76) Inventor: Anderson Bell, Chicago, IL (US)

(*) Notice: Subject to any disclaimer, the term of this patent is extended or adjusted under 35 U.S.C. 154(b) by 0 days.

(21) Appl. No.: 13/374,900

(22) Filed: Jan. 23, 2012

(65) Prior Publication Data

US 2012/0197704 A1 Aug. 2, 2012

Related U.S. Application Data

(63) Continuation of application No. 12/659,754, filed on Mar. 19, 2010, now Pat. No. 8,131,589.

(51) Int. Cl.
*G06Q 30/00* (2012.01)

(52) U.S. Cl.
USPC ...................................................... 705/26.1

(58) Field of Classification Search
USPC ............ 705/26.1, 26.81, 27.1, 27.2, 319, 344
See application file for complete search history.

(56) References Cited

U.S. PATENT DOCUMENTS

| | | | |
|---|---|---|---|
| 7,133,837 B1* | 11/2006 | Barnes, Jr. | 705/26.81 |
| 7,249,056 B1 | 7/2007 | Crouthamel et al. | |
| 7,565,332 B2 | 7/2009 | Williams et al. | |
| 7,783,719 B2* | 8/2010 | Miller | 709/217 |
| 2001/0020231 A1* | 9/2001 | Perri et al. | 705/14 |
| 2003/0014331 A1 | 1/2003 | Simons | |
| 2003/0023490 A1 | 1/2003 | Lenyon et al. | |
| 2003/0088475 A1 | 5/2003 | Goodman et al. | |
| 2005/0004837 A1* | 1/2005 | Sweeney et al. | 705/14 |
| 2005/0102227 A1 | 5/2005 | Solonchev | |
| 2006/0149620 A1 | 7/2006 | Reed et al. | |
| 2006/0190325 A1* | 8/2006 | Tarsh | 705/14 |
| 2006/0235749 A1* | 10/2006 | Moc | 705/14 |
| 2007/0016472 A1 | 1/2007 | Reznik | |
| 2007/0050245 A1 | 3/2007 | Humphries et al. | |
| 2007/0143157 A1* | 6/2007 | Sussman et al. | 705/5 |
| 2007/0219871 A1* | 9/2007 | Rolf et al. | 705/26 |
| 2007/0260736 A1 | 11/2007 | Miller | |
| 2008/0097871 A1* | 4/2008 | Williams et al. | 705/26 |
| 2008/0133257 A1 | 6/2008 | Adkisson et al. | |
| 2009/0171806 A1* | 7/2009 | Klinger et al. | 705/26 |
| 2009/0182646 A1* | 7/2009 | Klinger et al. | 705/26 |
| 2009/0259547 A1* | 10/2009 | Clopp | 705/14.16 |
| 2009/0265257 A1* | 10/2009 | Klinger et al. | 705/27 |
| 2009/0271289 A1* | 10/2009 | Klinger et al. | 705/26 |
| 2010/0070351 A1* | 3/2010 | Kang | 705/14.1 |

OTHER PUBLICATIONS

Multi Level Marketing by Steve Jones-2008.*
"Giftpoint.com Launches Advertising Initiative with E-Mail Marketing Pioneer epidemic.com" Business Wire, p. 1013, Feb. 11, 2000.

* cited by examiner

*Primary Examiner* — Matthew Zimmerman
(74) *Attorney, Agent, or Firm* — Harbin & Hein PLLC

(57) ABSTRACT

A method of tiered promotion and distribution of a product comprises hosting a transactional applet accessible via the Internet; accessing the host to execute the applet for a first fan; enabling the first fan to process a voucher for the product; and enabling the first fan to propagate the applet to a terminal of a second fan wherein the propagated applet (i) renders content associated with the first fan and the product, (ii) accepts an input from the second fan to process a subsequent transaction relative to the product; (iii) credits the first fan with a credit, and (iv) generates a transactional record for delivery to the first fan. The generated record may include a notation of account credit, evidence of an entry ticket, or other information. The applet may be propagated to third or subsequent fans to provide further credits for the first, second, or subsequent fans.

9 Claims, 6 Drawing Sheets

METHOD FOR CREDITING USERS BASED ON PROPAGATING A TRANSACTIONAL APPLET

This application is a continuation of U.S. patent application Ser. No. 12/659,754, filed Mar. 19, 2010, now U.S. Pat. No. 8,131,589, and entitled "METHOD AND SYSTEM FOR CREDITING USERS BASED ON PROPAGATING A TRANSACTIONAL APPLET."

BACKGROUND OF THE INVENTION

This invention relates to marketing and distribution, but more specifically, to a method and apparatus to enable a producer, supplier, promoter, and/or individual to promote, sell, and/or distribute a product or service over the Internet or other network.

In the past, certain products and services such as an entry ticket for an entertainment event have been sold through intermediary distributors having an established relationship with the producer or promoter. An event ticket for an entertainment or musical performance is used as an example in this disclosure. The cost of such tickets include intermediary or middleman service fees which are often shared with the producer, promoter, venue owner, and/or patrons. These service fees may add a significant cost to the ticket price and, in many instances, they exceed half of the ticket's price.

Increased costs cause many attendees to forego purchasing a ticket for an event that they otherwise would attend. Further, service fees diminish promoter profits, which profits might otherwise be used to book other events or for service improvements. Such middleman service fees may also injure venue owners because higher fees reduce ticket sales and reduce income. In addition, because online piracy of event productions, such as music recordings, is so prevalent, many performers have come to depend solely on live performances for their income. Higher patronage at shows increases revenue for these artists, which positively impacts their ability to continue performing. Therefore, reduction of middleman service fees would increase ticket sales, lower costs to the fans, and increase profits for promoters, venue owners, and the musical performers.

Prior attempts to use the Internet to promote, sell, and distribute tickets for musical performances provided only a limited success. Typically, a fan may purchase tickets to the event through a middleman's website, but each fan must separately access a particular website in order to purchase, reserve, and/or print an entry ticket. It would be beneficial to provide a system and method to increase the number of sites for ticket purchasing and distribution in order to increase ticket sales.

In the past, music event promoters have used email, mass messaging, and social networking sites to economically and quickly promote events and reach many individuals, but such techniques have had limited success due to a lack of credibility associated with the message originator. Accordingly, response rates for these types of promotion and distribution methods tend to produce a low number of actual ticket sales. In today's information-laden culture, individuals are bombarded with messages and very often ignore information from untrusted or unknown sources. Further, there is no assurance that the individual promoting the event has actually purchased a ticket or attended the associated event. Therefore, it would be beneficial to develop a system or method that provides a trusted source to promote and distribute credentials or tickets for musical and other events where the message originator is known or has purchased a ticket to the event. This would resolve the credibility problem and improve the chance that event information reaches a broader audience.

Music fans, for example, have less incentive to promote a musical event because there is no reward for doing so and present-day incentive methods are not well-suited for mass ticket sales or distribution. In other industries, tiered or multi-level marketing and distribution programs have been used to generate incentives to sell and recruit others to sell and distribute. But there are special challenges in the music industry that so far have made these methods impractical. Namely, musical events are time-sensitive events. Any multi-level promotion and ticket distribution program must be reset frequently, which currently is not done. In fact, most multi-level marketing programs are built and depend on a stable, non-changing structure. Therefore, it would be advantageous to provide a multilevel marketing and distribution method and system for ticket sales that would reset and propagate itself quickly.

Although a musical event was used as an example, one of skill in the art will appreciate that many of these solutions disclosed herein apply to other time sensitive events whose ticket sales and distribution may be enhanced through a credible promotion source and through providing multiple sales and distribution channels. For example, the airline industry, hotel industry, exhibition industry, sporting industry, theater industry, or an enthusiast gathering (e.g., 1970s muscle car club), and the like, are all examples of industries whose product has a temporal limit.

Accordingly, it would be beneficial to provide an Internet-based, multi-level marketing and distribution system and method that provide quick reset capabilities for new events. It would further be beneficial for such system and method to provide trusted information and to increase the number of points of sales/distribution for tickets. The present invention accomplishes these among other things in order to solve the above-mentioned problems.

SUMMARY OF THE INVENTION

According to the present invention, there is provided a method of promoting and distributing a product comprising the steps of providing a site to store a transactional applet accessible via a network; accessing the site via a network, such as the Internet, to render a transactional applet on a user interface associated with a terminal of a first fan; enabling the first fan to process at least one voucher for the product via the user interface; permitting the first fan to propagate the transactional applet from his or her site to a terminal of a second fan wherein the propagated applet is capable of (i) rendering content associated with the first fan and his or her purchase of the product and (ii) accepting an input from the second fan in order to process a subsequent transaction relative to the product; and generating a record or incentive credit of the transaction for delivery to the first fan. The record may include a notation of account credit, evidence of an entry ticket, or other information.

In a further embodiment, the method includes registering a third fan providing an input to an applet propagated from the second fan's site, and, based on the input, granting a third fan permission to again propagate the applet to at least other site wherein the at least other site may be the same or different than the second fan's site. The method also includes providing the second fan credit from a second credit layer and providing the first fan credit from a first credit layer and a second credit layer of a credit database.

In other embodiments, the site may comprise a social networking site, a mass messaging site, a website, a blog, or an email. In yet further aspects of the invention the product may be an entry ticket to a musical event, a theatrical event, a party, a sporting event, an enthusiast gathering, a merchandise promotion, a hotel room, an airline flight, or an exhibition. In yet another aspect of the invention, the input or transaction may comprise a purchase of a good, ticket, or service. And in yet further embodiments, different credit amounts may be granted the respective fans for each credit layer. In some embodiments, different credit amounts may be granted for each said credit layer depending on the number of copies of the applet rendered on the at least one site. In a further aspect of the invention, different credit amounts may be granted to a fan for each credit layer depending on the number of applet propagations that emanate from a fan and that are rendered on a site. In another aspect of the invention, the credit may include cash, a promotional product, or a concession at an event.

In another embodiment of the method invention, said product may have a temporal limit. And in yet another aspect of the method invention, permission for a fan to render an applet or copy of an applet is removed after the product's temporal limit.

Another aspect of the invention comprises a system to promote and/or distribute a product via a user interface terminal in communication with a network wherein the system comprises a credit database to store credit layers associated with completed fan transactions; a transactional applet of the site that is accessible via a network to enable a first fan to process at least one voucher relative to the product; a processor module of the applet to permit the first fan to propagate execution of the applet from the site to a terminal of a second fan in order to (i) render content associated with said first fan and the product, (ii) accept an input from the second fan in order to process a subsequent transaction relative to the product, and (iii) credit the first fan with a credit from the credit database upon completion of subsequent transactions by at least one other fan; and an output device to produce a record of a transaction of the processor module for delivery to the first fan.

In one embodiment, the system includes a credit database for storing transactional records related to product vouchers, for storing a second fan transactional activity, and for storing a third or subsequent fan transactional activity. This embodiment may also provide a database for storing at least one permission from a fan to propagate the applet on at least one site. This embodiment may also provide a transactional applet capable of displaying content associated with a previous fan and the product, accepting at least one input from a subsequent fan, accepting a permission indication, and being rendered on at least one site. This embodiment may also comprise a database for storing data including at least one credit layer and a server for rendering or effecting execution of the transaction applet on a site, the server further tracking inputs from a second fan and from a third fan and the server further relaying a credit from the at least one credit layer to the first fan and the second fan.

In another aspect of the invention, the transactional input may include purchasing a product, ticket, or service. In another aspect of the invention, the product is an entry ticket for a musical event, a theatrical event, a party, a sporting event, an enthusiast gathering, a merchandise promotion, a hotel room, an airline flight, or an exhibition.

Other aspects of the invention will become apparent upon review of the following description taken in connection with the accompanying drawings. The invention, though, is pointed out with particularity by the appended claims.

DETAILED DESCRIPTION OF THE INVENTION

The present invention relates to a method and a system to provide an applet on a site for affiliate and multi-level marketing. Although the following description provides several embodiments of the invention, one of skill in the art will readily see various modifications to the preferred embodiments depicted herein. Accordingly, the present invention and illustrated embodiments are not meant to limit the invention to less than the full scope defined by the appended claims.

The embodiments described herein use the Internet as the preferred network, but other communication networks may effectively be substituted for use with this invention. For example, a cellular telephone network, wide area network, or an Ethernet network may effectively be implemented with the invention described herein.

Figure 1:
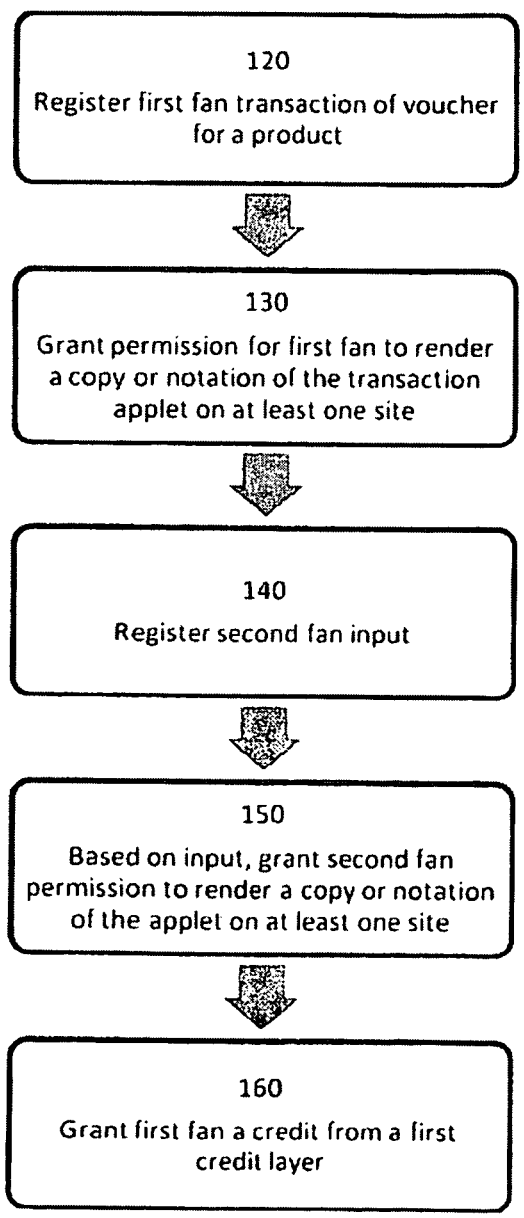
FIG. 1 describes an exemplary embodiment of a method for providing an applet on a site for affiliate and multi-level marketing.

FIG. 1 depicts an embodiment of a method 100 to provide a sales/distribution applet implemented in a user interface of a site for use in affiliate or multi-level marketing/distribution of a product or service. The site may comprise, for example, a social networking site, a mass messaging site, a website, a blog, or an email server. Marketing and distribution may be performed through various electronic media via the Internet, such as a mobile phone or a computer. Affiliate and multi-level marketing may be directed to an event, such as a musical event, a theatrical performance, a party, a sporting event, an enthusiast gathering, an exposition, a merchandise promotion, or the like. Marketing and distribution may also be directed to a service, such as a hotel room or an airline flight. In many instances, such events and products have a temporal limit, e.g., a concert ends at a certain time and date and a hotel room cannot be rented for a date in the past. Such temporal limitations often create an urgency to sell and distribute such products and services, a problem that the present invention advantageously ameliorates.

In step 120, a first fan initiates a voucher transaction applet for a product (e.g., a ticket purchase), and the transaction is registered. For sake of illustration, the voucher transaction is directed to a ticket and the product a concert. The first fan purchases a ticket to the concert and the purchase is registered. In step 130, the transaction applet grants permission for the first fan to render a copy or notation of the transaction applet on at least one site. In some embodiments of the invention, the first fan may render as many copies or notations of the transaction applet as he/she desires. The transaction applet may display content associated with the product and may accept an input from the fan. In some embodiments, the fan may customize the transaction applet to suit his or her taste. A site may include the first fan's social networking site or an email server or a chat room or a mass messaging site or even a blog. The content displayed via the transaction applet, for example, may include an advertisement for an upcoming concert and the input accepted may be a ticket purchase or a message to the musical artist.

In step 140, the transaction applet registers the input of a second fan. Again, as an example, this input may include the fan purchasing a ticket or sending a message to the musical artist. Based on this input, in step 150, the transaction applet grants the second fan permission to render a copy or notation of the applet on at least one other site, wherein the other site may be the same as the first fan's site or different than the first fan's site. Again, in certain embodiments, the copy or notation of the transaction applet may be the same as the first fan's, including whatever customization the first fan may have made to the applet, or the copy or notation may be a "clean" copy of the transaction applet without any customization. Further, in some embodiments of the invention different types of copies or notations of the applet may be available to a fan to render. For example, there may be three different applets for a musical concert. All such copies are considered the same "copy" of the applet because all three relate to the same event, and all such copies will be simply referred to as a copy of the applet. In step 160, the applet grants the fan a credit from a first credit layer. Some embodiments of the applet comprise multiple credit layers, and the invention contemplates that the applet may grant different credit amounts for each credit layer. The invention also contemplates granting different credit amounts for each credit layer depending on the number of copies of an applet on a site. For example, if a first fan has over a certain number of copies of the applet on a particular social networking site or email provider, the first fan will receive a higher credit amount. In some aspects of the invention, the credits can comprise cash, promotional products, or concessions at a concert event.

Figure 2:
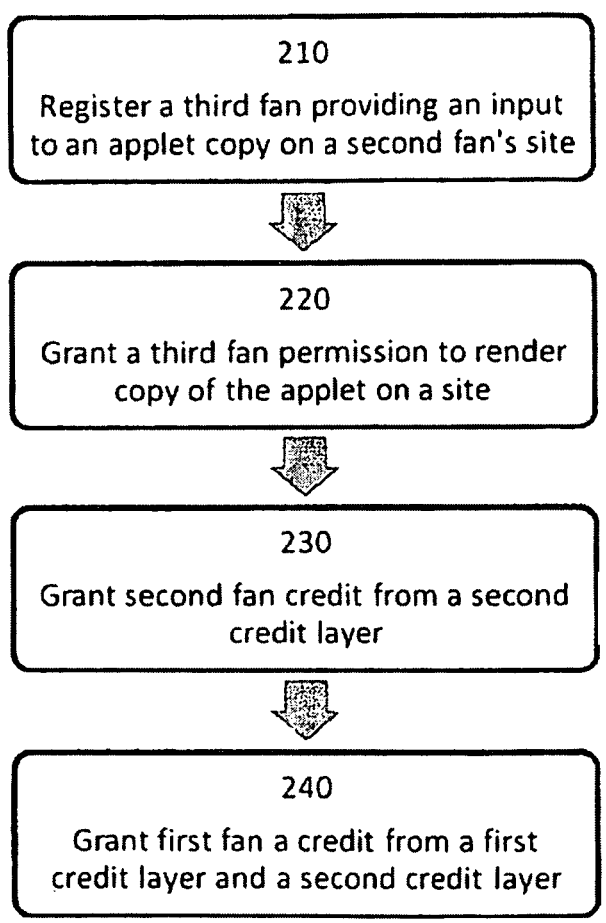
FIG. 2 describes a further exemplary embodiment of a method for providing an applet on a site for affiliate and multi-level marketing.

FIG. 2 describes another embodiment of the invention of a method 200 for providing transactional applet on a site for affiliate and multi-level marketing. In step 210, the transaction applet registers an input to an applet copy on the second fan's site from a third fan. As discussed in the examples above, the input may include any number of actions, such as a ticket purchase or a message to a musical artist. Based on the input, in step 220, the applet grants the third fan permission to render at least one copy of the applet on a site. Similar to step 150, the site may be the same as the second fan's site or the first fan's site or it may be different than all of these sites. Also similar to step 150, the site could be, for example, a third fan's social networking site or an email or a mass messaging site or even a blog. The content displayed via the applet, for example, may include an advertisement for an upcoming concert and the input accepted may be a ticket purchase instruction or a message to the musical artist. In step 230, the applet grants the second fan a credit from a second credit layer. And in 240 the applet grants the first fan a credit from a first credit layer and a second credit layer. The amount of credit granted from the first and second credit layers may be different or the same.

Figure 2A:
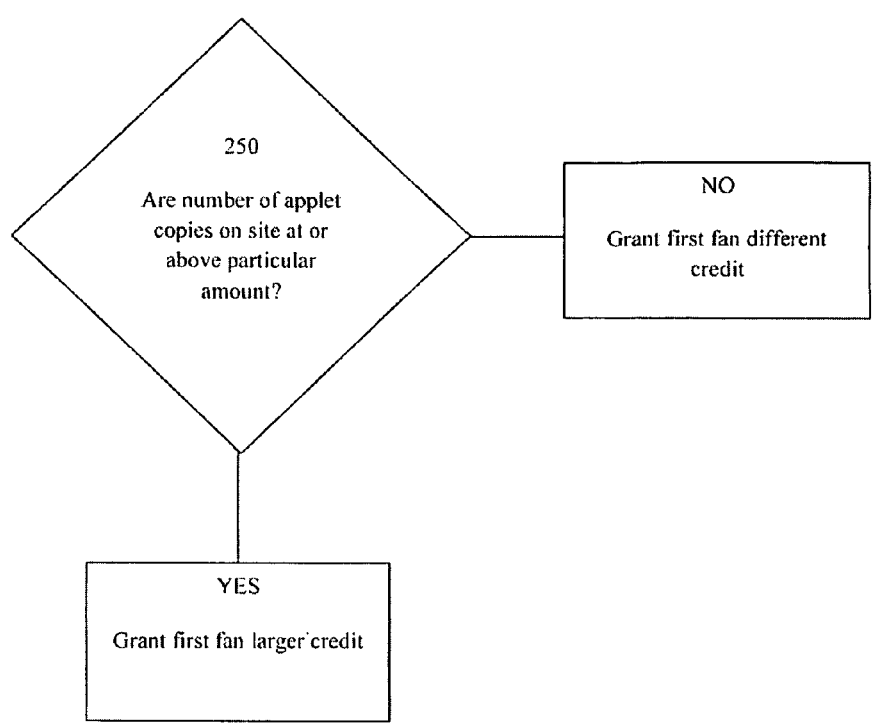
FIG. 2A describes another exemplary embodiment of a method for providing an applet on a site for affiliate and multi-level marketing.

In some embodiments of the invention, as illustrated in FIG. 2A, the amount of credit granted by the transactional applet may be different depending on the number of applet copies or transactional notations that are rendered on a site. In step 250, the applet checks to determine whether the number of applet copies on a site are at or above a particular amount. If the number of applet copies or transaction notations is at or above a particular amount, the transaction applet grants the first fan a larger credit. If the number of applet copies or notations is below a certain amount, the transactional applet grants the fan a different credit. For illustration, the number of applet copies or transaction notations on a particular email system or a social networking site may be counted. If the total number of applet copies or transactional notations on the site exceeds a target amount, the first fan is granted a larger credit.

Figure 2B:
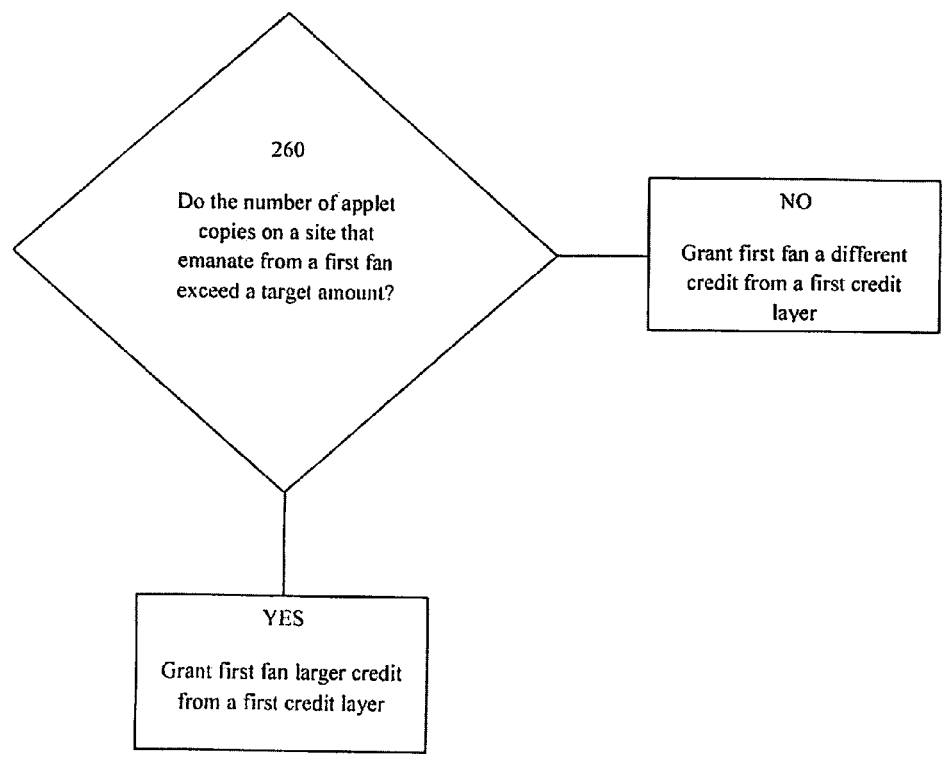
FIG. 2B describes yet another exemplary embodiment of a method for providing an applet on a site for affiliate and multi-level marketing.

In FIG. 2B, step 260 illustrates a further aspect of the invention where the transactional applet checks to determine if the number of applet copies or notations on a site that emanate from a first fan exceed a target amount. If so, the first fan is granted a larger credit from a first credit layer. If the number of applet copies or notations emanating from a first fan is below a certain amount, the first fan is granted a different credit from a first credit layer. In other embodiments of the invention, the above-described aspect is extended to a second fan and a third fan and to various permutations of the credit levels. As mentioned earlier, the credits may comprise cash, promotional products, concessions at a concert event, and the like.

Figure 3:
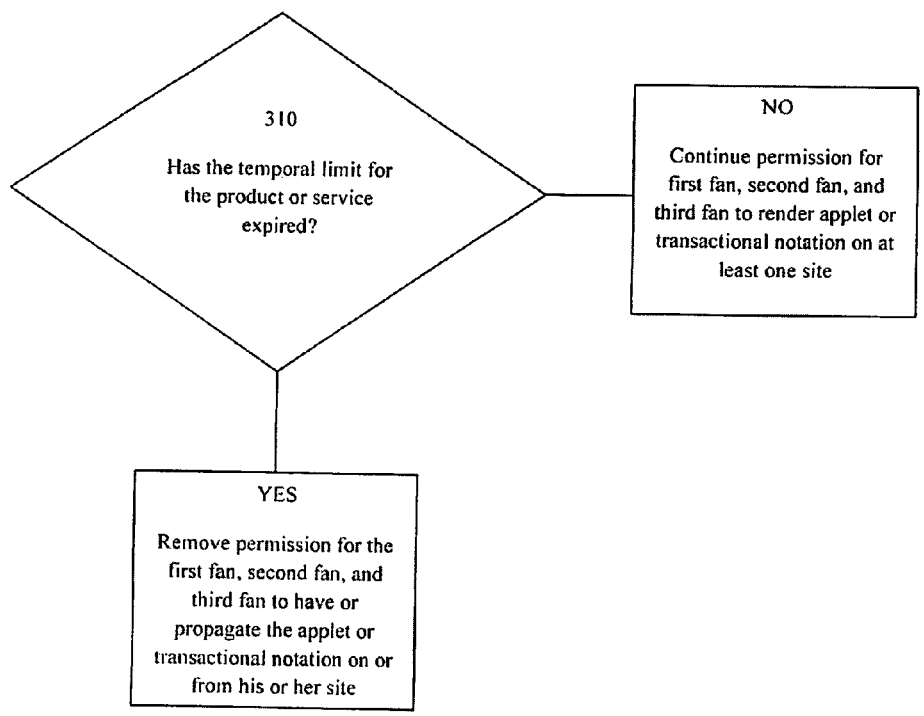
FIG. 3 describes an exemplary embodiment of a method for removing permission for rendering an applet on a site for affiliate and multi-level marketing.

FIG. 3 describes an embodiment of the invention involving a temporal limit to the product or service. As mentioned, many events have a temporal limit to them, e.g., a hotel room or a musical concert. As such, it may be desirable to remove a copy of the transactional notation from sites after the event's temporal limit is reached. In step 310, one embodiment of the invention, the transactional applet checks to see if the temporal limit for the product or service has expired. If so, the transactional applet removes permission for the first fan, second fan, and third fan to have or propagate the applet or transactional notation on or from his or her site. Such permission removal may remove the applet notation from the site or remove the ability to accept an input. If the temporal limit has not been reached, the first fan, second fan, and third fan are permitted to continue to render the applet or transactional notation on at least one site.

Figure 4:
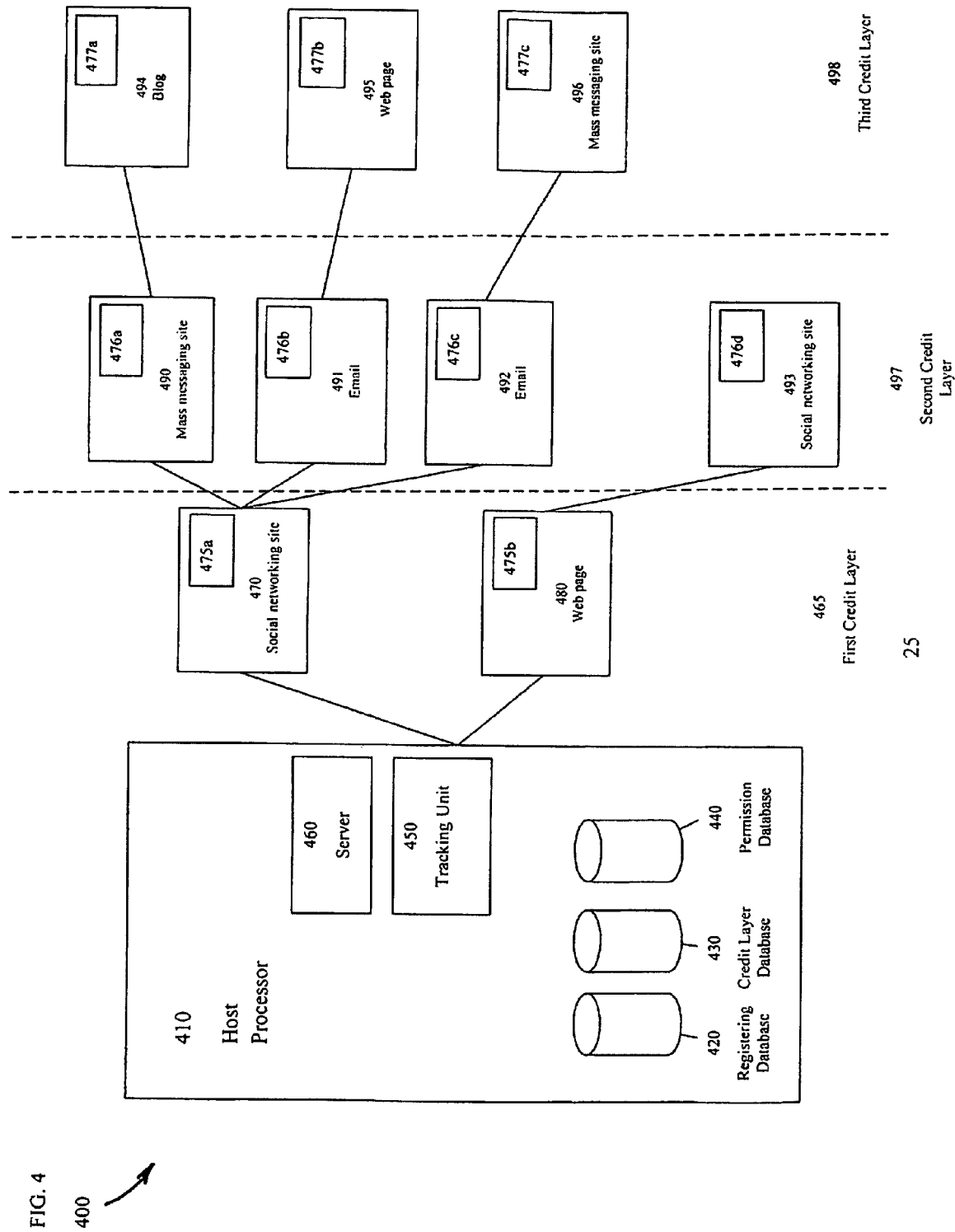
FIG. 4 describes an exemplary embodiment of a system for performing affiliate and multi-level marketing over the Internet using applets.

FIG. 4 describes an exemplary embodiment of the system 400 to provide transaction applet or notation on a site for affiliate and multi-level marketing. In this embodiment, the system 400 includes a host processor 410. The host 410 may comprise a server 460 for rendering a copy of an applet or notation thereof on a site, for tracking inputs from fans, and for relaying credit from a credit layer database 430 that contains credits. The host may also contain a tracking unit 450 that tracks the amount of credit a first fan, a second fan, or a third fan has received or that tracks at least one credit layer. Host processor 410 also may include or access a database 420 that registers fan transactions for a voucher for a product/service, an input of a second fan, or an input of a third fan. Further, the host 410 may also contain or access a database 440 that stores permissions for a fan, a second fan, or a third fan to render an applet or notation thereof on at least one site. Although databases 420, 430, and 440 are described as separate databases, one of skill in the art would readily recognize that they may be housed within a single physical database structure. Likewise, although only one tracking unit 450 is disclosed in this embodiment of the invention, one of skill in the art could easily locate the two functions described therein to separate tracking units.

Site 470 describes a social networking site of a fan on which a copy or notation of an applet 475a has been rendered. In the depicted embodiment, the applet 475a is capable of displaying content associated with a product/service, accepting at least one input, accepting a permission indication, and being rendered on a site. The applet 475a is associated with a first credit layer 465, because the fan who is associated with this site 470 made a transaction of a voucher for a product. Such a transaction could be purchasing a ticket. Site 480 describes a web page site of a fan on which a copy of an applet 475b has been rendered. Site 480, too, is associated with a first credit layer because the fan associated with this site 480 made a transaction of a voucher for a product.

Sites 490 (a mass messaging site), 491 (an email), 492 (another email), and 493 (a social networking site) all have applets 476a-d, respectively, rendered on their site that are copies of the transactional applets 475a-b on the 470 and 480 sites. The applets on the 490, 491, and 492 sites are copies of the applets or notations thereof on the 470 site and the applet on the 493 site is a copy of the applet on the 480 site. For each of these applets 476a-d, a fan provided an input to applet 475 in order to receive permission to render a copy of applet 476 on the fan's site. Once the fan receives permission, in one aspect of the invention, the fan may render as many applet copies 476 as he or she pleases. Applet 476 is associated with a second credit layer 497 because the fan or fans associated with sites 490, 491, 492, and 493 provided an input to applet 475, which is associated with a first credit layer 465.

Sites 494 (a blog), 495 (a web page), and 496 (a mass messaging site) all have applets 477a-c, respectively, rendered on their site that are copies of the applets 476a-d on the 490, 491, 492, and 493 sites. The applet on the 494 site is a copy of the applet on the 490 site. The applet on the 495 site is a copy of the applet on the 491 site. And the applet on the 496 site is a copy of the applet on the 492 site. In some aspects of the invention, a copy or group of copies of applets may be different from another copy or group of copies if they are copies from different parent applets. For each of the applet 477, a fan had to provide an input to applet 476 in order to receive permission to render a copy of applet 476 on the fan's site. After the fan receives permission, in one aspect of the invention, the fan may render as many copies of the applets 477 as he or she desires. Applet 477 is associated with a third credit layer 498 because the fan or fans associated with sites 494, 495, and 496 provided an input to applet 476, which is associated with a second credit layer 497. In some embodiments of the invention, one site may contain multiple copies of an applets or notations thereof, and each copy may be associated with a different credit layer.

I claim:

1. A method for receiving data comprising:
    receiving data from a server, said data generated by providing a credit database of credit layers, wherein each credit layer is associated with specified credit amounts;
    rendering a transactional applet on a first network site, wherein the transactional applet enables a purchase at least one voucher for a product or service;
    propagating, in response to a request from a first fan, at least a first copy of the transactional applet to a second network site having a first credit layer associated therewith;
    propagating, in response to a request from a second fan, at least a second copy of the transactional applet to a third network site having a second credit layer associated therewith;
    determining, by an applet server, a first total number of copies of the transactional applet propagated on the second network site, and granting the first fan a first credit from the first credit layer if the first total number exceeds a first predetermined amount, otherwise granting a first smaller credit; and
    determining, by the applet server, a second total number of copies of the transactional applet propagated on the third network site, and granting each of the first fan and the second fan a second credit from the second credit layer if the second total number exceeds a second predetermined amount, otherwise granting a second smaller credit.

2. The method of claim 1 wherein said data comprises at least one of the following:
    fan data filtered by said first or second credit layer, credit layer data, number of said transactional applets, number of said transactional applets associated with said first fan, number of said transactional applets associated with said second fan, number of said transactional applets associated with said credit layer.

3. The method of claim 1 further comprising modifying said product or service based on said data.

4. The method of claim 1 further comprising creating a promotional program based on said data.

5. The method of claim 1 further comprising determining advertising fees based on said data.

6. The method of claim 1 further comprising modifying said credit based on said data.

7. The method of claim 1 further comprising modifying promotion of said product or service based on said data.

8. The method of claim 1 further comprising modifying promotion of a different product or service based on said data.

9. The method of claim 1 further comprising determining promotional fees based on said data.

* * * * *